United States Patent
Wang et al.

(10) Patent No.: US 11,373,038 B2
(45) Date of Patent: Jun. 28, 2022

(54) METHOD AND TERMINAL FOR PERFORMING WORD SEGMENTATION ON TEXT INFORMATION, AND STORAGE MEDIUM

(71) Applicant: Beijing Xiaomi Intelligent Technology Co., Ltd., Beijing (CN)

(72) Inventors: Shuo Wang, Beijing (CN); Liang Shi, Beijing (CN); Yupeng Chen, Beijing (CN); Qun Guo, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 72 days.

(21) Appl. No.: 16/872,793

(22) Filed: May 12, 2020

(65) Prior Publication Data
US 2021/0157981 A1 May 27, 2021

(30) Foreign Application Priority Data
Nov. 25, 2019 (CN) .......................... 201911168682.6

(51) Int. Cl.
G06F 40/205 (2020.01)
G06F 40/284 (2020.01)

(52) U.S. Cl.
CPC .......... *G06F 40/205* (2020.01); *G06F 40/284* (2020.01)

(58) Field of Classification Search
CPC .............................. G06F 40/205; G06F 40/284
USPC ............................................................ 704/9
See application file for complete search history.

(56) References Cited

U.S. PATENT DOCUMENTS

| | | | |
|---|---|---|---|
| 6,678,409 B1* | 1/2004 | Wu | G06K 9/00463 382/177 |
| 2010/0049500 A1* | 2/2010 | Kobayashi | G10L 15/193 704/235 |
| 2018/0365217 A1* | 12/2018 | Zheng | G06F 40/253 |
| 2019/0392209 A1* | 12/2019 | Tashiro | G06F 40/131 |
| 2020/0251097 A1* | 8/2020 | Hu | G10L 15/1822 |
| 2021/0141998 A1* | 5/2021 | Chen | G06F 40/284 |

(Continued)

OTHER PUBLICATIONS

Supplementary European Search Report in the European Application No. 20176513.8, dated Nov. 17, 2020, (9p).

(Continued)

*Primary Examiner* — Edwin S Leland, III
(74) *Attorney, Agent, or Firm* — Arch & Lake LLP (57) ABSTRACT

The present disclosure relates to a method and a terminal for performing word segmentation on text information, and a storage medium. The method includes: acquiring the text information and configuration information, in which the configuration information includes at least two first word segmentation rules; converting the first word segmentation rules into second word segmentation rules according to a predetermined rule; in response to determining that an intersection exists between character strings of the text information matched by two of the second word segmentation rules, determining that two first word segmentation rules corresponding to the two of the second word segmentation rules associated with the intersection conflict; and processing the text information according to the configuration information, and outputting a result of the word segmentation on the text information.

17 Claims, 4 Drawing Sheets

(56) References Cited

U.S. PATENT DOCUMENTS

2021/0157981 A1\* 5/2021 Wang .................... G06F 40/284

OTHER PUBLICATIONS

Yeh, Ching-Long et al., "Rule-Based Word Identification For Mandarin Chinese Sentences a Unification Approach", Computer Processing of Chinese Andoriental Languages, The Society, San Francisco, CA, US, vol. 5, No. 2, Mar. 1, 1991, XP002116761, ISSN: 0715-9048, (22p).
Chen, Keh-Jiann et al., "Word Identification For Mandarin Chinese Sentences", Computational Linguistics, Association for Computational Linguistics, N. Eight Street, Stroudsburg, PA,18360 07960-1961 USA, Aug. 23, 1992, (7p).
Jurafsky, Daniel et al., "Regular Expressions, Text Normalization, Edit Distance", Speech and Language Processing, Aug. 7, 2019, XP55747732A, (25p).

\* cited by examiner

| A | B | C |
|---|---|---|
| Original word：/主要/ | Original word：只有 | Original word：只有 |
| Target word：主/要 | Target word：/只有/ | Target word：只/有 |
| There is a prefix：摊 | There is a prefix： | There is a prefix：一 |
| There is no prefix： | There is no prefix： | There is no prefix： |
| There is a suffix：求 | There is a suffix： | There is a suffix： |
| There is no suffix： | There is no suffix：点 | There is no suffix： |

METHOD AND TERMINAL FOR PERFORMING WORD SEGMENTATION ON TEXT INFORMATION, AND STORAGE MEDIUM

CROSS-REFERENCE TO RELATED APPLICATIONS

The present application is based upon and claims the priority of Chinese patent application No. 2019111686826, filed on Nov. 25, 2019, the entire contents of which are incorporated herein by reference in its entirety for all purposes.

TECHNICAL FIELD

The present disclosure generally relates to the technical field of computers, and more particularly, to a method and a terminal for performing word segmentation on text information, and a storage medium.

BACKGROUND

In configuration information for word segmentation on text information, some word segmentation rules in the configuration information may usually conflict with some other word segmentation rules. For example, final word segmentation results obtained by processing the same input statement in the text information with two conflicting word segmentation rules are different. Sometimes, these conflicting word segmentation rules may not be accurately discovered, and resulting in the problems of inaccurate word segmentation.

SUMMARY

The present disclosure provides a method, a terminal and a non-transitory computer readable medium for performing word segmentation on text information.

According to a first aspect of the present disclosure, a method for performing word segmentation on text information is provided. The method may include acquiring the text information and configuration information, where the configuration information may include at least two first word segmentation rules; converting the first word segmentation rules into second word segmentation rules according to a predetermined rule; in response to determining that an intersection exists between character strings of the text information matched by two of the second word segmentation rules, determining that two first word segmentation rules corresponding to the two of the second word segmentation rules associated with the intersection conflict; and processing the text information according to the configuration information, and outputting a result of the word segmentation on the text information.

According to a second aspect of the present disclosure, a terminal for performing word segmentation on text information is provided. The terminal may include: a processor; and a memory, configured to store instructions executable by the processor. The processor may be configured to: acquire the text information and configuration information, where the configuration information may include at least two first word segmentation rules; convert the first word segmentation rules into second word segmentation rules according to a predetermined rule; in response to determine that an intersection exists between character strings of the text information matched by two of the second word segmentation rules, determine that two first word segmentation rules corresponding to the two of the second word segmentation rules associated with the intersection conflict; and process the text information according to the configuration information and output a result of the word segmentation on the text information.

According to a third aspect of the present disclosure, a non-transitory computer-readable storage medium is provided, in which a computer program is stored. The computer program, when executed by a processor, may cause the processor to implement a method for performing word segmentation on text information, and the method may include: acquiring the text information and configuration information, where the configuration information may include at least two first word segmentation rules; converting the first word segmentation rules into second word segmentation rules according to a predetermined rule; in response to determining that an intersection exists between character strings of the text information matched by two of the second word segmentation rules, determining that two first word segmentation rules corresponding to the two of the second word segmentation rules associated with the intersection conflict; and processing the text information according to the configuration information, and outputting a result of the word segmentation on the text information.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Detailed description is made here as examples which are illustrated in the accompanying drawings. The following description refers to the accompanying drawings in which identical numerals in different drawings represent identical or similar elements unless otherwise represented. The implementations set forth in the following description of examples do not represent all implementations consistent with the present disclosure. Instead, they are merely examples of terminals and methods.

The terms used in the present disclosure are only for the purpose of describing exemplary examples and are not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" can be interpreted as "when" or "upon" or "in response to" depending on the context.

Figure 1:
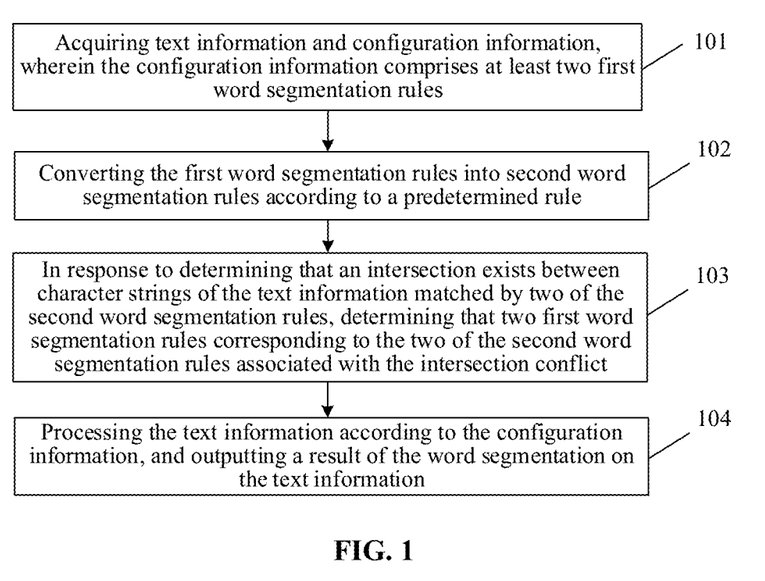
FIG. 1 is a flowchart showing a method for performing word segmentation on text information according to some examples of the disclosure.

FIG. 1 is a flowchart showing a method for performing word segmentation on text information according to some examples of the disclosure. As illustrated in FIG. 1, the method includes the following steps.

In Step 101, acquiring the text information and configuration information, where the configuration information may include at least two first word segmentation rules.

The method may be applied to a terminal. The terminal may specifically be a mobile terminal and a fixed mobile. The mobile terminal may be a mobile phone, a tablet computer, a notebook computer and the like. The fixed terminal may be a desktop computer.

The configuration information may be set in software installed in an executing terminal or software installed in a tested terminal. The software can be configured to perform word segmentation on input text information. For example, the software may be reading software that performs word segmentation on the input text information through the configuration information and read according to meanings of segmented words to improve user experience. The software may also be search software that can perform word segmentation on an input search statement according to the word segmentation rules in the configuration information and search according to meanings of segmented words to improve search efficiency.

When the configuration information is set in the executing terminal, the executing terminal can acquire the configuration information in the software in the executing terminal to execute the method. Step 101 may include that the executing terminal acquires the configuration information stored by itself.

When the method is applied to the executing terminal and the configuration information is set in the tested terminal, Step 101 may be implemented as follows: the executing terminal acquires the configuration information of the tested terminal from the tested terminal. The tested terminal and the executing terminal are different terminals.

The configuration information may be a code set of related rules configured to perform word segmentation on the input text information. If the input text information is " 客 房费用处 " word segmentation may be performed on the input text information according to the configuration information to obtain "客房费/用处".

In Step 102, converting the first word segmentation rules into second word segmentation rules according to a predetermined rule.

It can be understood that the following contents of a word segmentation rule in the configuration information are defined: an original word, a target word and a replacement condition. The replacement condition may include a closed condition and may also include an open condition.

It can be understood that, if the word segmentation rule includes the open condition, the word segmentation rule is an indeterminate rule. Correspondingly, if the word segmentation rule includes the closed condition, the word segmentation rule is a determinate rule.

For example, the closed condition can be a positive condition. For example, when a word appears before the original word, the original word can be replaced with the target word, otherwise is not replaced. Thus, there may be only one circumstance existing for this condition, namely a word appears before the original word. Therefore, the rule limited by the condition is a determinate rule.

The open condition can be a negative condition. For example, when a word does not appear before the original word, the original word can be replaced with the target word. Apparently, there is more than one circumstance that a word does not appear before the original word. Therefore, the rule limited by the condition is an indeterminate rule.

That is, word segmentation rules may be divided into determinate word segmentation rules and indeterminate word segmentation rules according to different replacement conditions. Thus, if the replacement condition is the open condition, the word segmentation rule corresponding to the replacement condition is an indeterminate rule; and if the replacement condition is the closed condition, the word segmentation rule corresponding to the replacement condition is a determinate rule.

In some examples, the predetermined rule may include a preset rule for converting the first word segmentation rule into the second word segmentation rule. The rule for conversion of the first word segmentation rule into the second word segmentation rule may include a series of rules for conversion of the first word segmentation rule into the second word segmentation rule by conversion of replacement conditions.

The rule for conversion of the first word segmentation rule into the second word segmentation rule by conversion of the replacement conditions can be, for example, converting an indeterminate replacement condition in the first word segmentation rule into a determinate replacement condition to form the second word segmentation rule. For example, the indeterminate replacement condition is replaced with the determinate replacement condition. The determinate replacement condition may be added by a configurator, may also be acquired from another word segmentation rule of the configuration information and, of course, may also be acquired from a cloud server. A replacement source and a replacement manner for the replacement condition are not limited. In the example, the replacement conditions can be converted according to the predetermined rule to convert the indeterminate word segmentation rule into the determinate word segmentation rule.

A first set may include replacement conditions in the at least two first word segmentation rules, the replacement condition may be a condition for replacement of an original word into a target word, and the operation that the first word segmentation rule is converted into the second word segmentation rule may further include that: if a first condition in the first word segmentation rule is an open condition, a second set is obtained according to the first set, a second condition in the second set may be a replacement condition, except the first condition, of the first set; and the second word segmentation rule may be formed based on the original word and the target word in the first word segmentation rule, and the second condition.

The first set may be a set including the replacement conditions in all the first word segmentation rules in the configuration information, and the second set may be a set including the replacement conditions except the first condition in the present first word segmentation rule. When the first condition in the present first word segmentation rule is an open condition, the first condition of the first word segmentation rule may be replaced with a closed condition in the replacement condition of another first word segmentation rule of the configuration information to form a determinate second word segmentation rule by conversion. According to the example, manual operations of the configurator are avoided, networking is also avoided, and simplicity and high speed for implementation are ensured.

In another example, the operation that the second set is obtained according to the first set if the first condition in the first word segmentation rule is the open condition may include that: if the first condition in the first word segmentation rule is the open condition, the second condition in the second set is determined based on an entry limited by a closed condition in the first word segmentation rule including the closed condition in the configuration information; and the second set is obtained according to the second condition in the second set.

It can be understood that the first word segmentation rule including negative fields with a negative meaning may include an original word, a target word and an open condition. If the original word is, for example, "只有", the target word is, for example, "只有" and the open condition is that, for example, "点" does not appear after the original word", the original word is replaced with the target word. This means that, if "点" does not appear after "只有", the target word is "只有", namely "只有" may not be segmented into "只" and "有". There is infinitely much text information meeting the condition that "点" does not appear after "只有". Therefore, the first word segmentation rule including the open condition is an indeterminate rule, and the first rule including the open condition is indeterminate.

The second condition in the second set may actually be understood as a closed condition.

In some examples, the second condition in the second set may supplement the condition of the first word segmentation rule including the open condition, namely the first condition of the first word segmentation rule is replaced with the second condition in the second set such that the first word segmentation rule including the open condition becomes the determinate second word segmentation rule.

In the example, if the first word segmentation rule includes the open condition, the second set may be obtained according to the first set, the second condition in the second set being the replacement condition, except the first condition, in the first set, and the second word segmentation rule is formed based on both the original word and the target word in the first word segmentation rule, and the second condition. In such a manner, rule supplementation to the first word segmentation rule including the open condition is implemented in a manner of replacing the first condition of the first word segmentation rule to convert such an indeterminate first word segmentation rule including the open condition into the determinate second word segmentation rule, and adopting the determinate second word segmentation rule as a judgment basis for subsequently determining whether the word segmentation rules conflict or not may improve accuracy of the determined conflicting first word segmentation rules.

Furthermore, the open condition can be represented with negative fields with a negative meaning, and the closed condition can be represented with negative fields without a negative meaning.

The first word segmentation rule including negative fields with a negative meaning may be also an indeterminate rule.

In some examples, the open condition includes negative fields with a negative meaning, and the negative field with the negative meaning includes at least one of:

a first type of negative fields before an original word to be matched in the first word segmentation rule; and a second type of negative fields after the original word to be matched in the first word segmentation rule.

In some examples, there is made such a hypothesis that the configuration information includes a first word segmentation rule A, a first word segmentation rule B and a first word segmentation rule C. The first word segmentation rule A includes negative fields with a negative meaning, the first word segmentation rule B includes positive fields with a positive meaning, and the first word segmentation rule C also includes positive fields. In such case, a second condition in a second set corresponding to the first word segmentation rule A can be determined by entries connected with the respective positive fields of the first word segmentation rule B and the first word segmentation rule C. In such a manner, the second condition in the second set can be determined directly based on the replacement condition of another word segmentation rule, except the first condition of the first word segmentation rule A, in the configuration information without manual supplementation, namely the second condition in the second set is automatically determined and the second word segmentation rule is automatically generated, so that intelligence of detection of a conflict between the word segmentation rules is improved, meanwhile, adaptability to the configuration information with relatively more first word segmentation rules and a large processed information amount is achieved, and a processing speed is increased.

Furthermore, the closed condition includes positive fields with a positive meaning. The operation that the second condition in the second set is determined based on the entry limited by the closed condition in the first word segmentation rule including the closed condition in the configuration information if the first word segmentation rule includes the open condition includes at least one of the following operations:

if the first word segmentation rule includes the first type of negative fields, the second condition in the second set is determined based on an entry connected with a first type of positive fields of the first word segmentation rule including the first type of positive fields in the configuration information, the first type of negative fields and the first type of positive fields being at a same position in the first word segmentation rule, but with different meanings; and if the first word segmentation rule includes the second type of negative fields, the second condition in the second set is determined based on an entry connected with a second type of positive fields of the first word segmentation rule including the second type of positive fields in the configuration information, the second type of negative fields and the second type of positive fields being at a same position in the first word segmentation rule, but with different meanings, and the second type of negative fields and the first type of negative fields being at different positions in the first word segmentation rule.

That the first type of positive fields and the first type of negative fields are at the same position in the first word segmentation rule can be understood that both the first type of positive fields and the first type of negative fields are configured to limit words appearing at the same position relative to the original word to be matched. It can be understood that the first type of negative fields is before the original word to be matched in the first word segmentation rule, and correspondingly, the first type of positive fields is also before the original word to be matched in the first word segmentation rule. For example, the first type of negative fields may be configured to limit the circumstance that a first keyword does not appear before the original word to be matched, while the first type of positive fields may be configured to limit the circumstance that a second keyword appears before the original word to be matched, the first keyword and the second keyword can be the same or different.

Correspondingly, that the second type of positive fields and the second type of negative fields are at the same position in the first word segmentation rule can be understood that both the second type of positive fields and the second type of negative fields are configured to limit words appearing at the same position relative to the original word to be matched. It can be understood that the second type of negative fields is after the original word to be matched in the first word segmentation rule, and correspondingly, the second type of positive fields is also after the original word to be matched in the first word segmentation rule. For example, the second type of negative fields may be configured to limit the circumstance that a third keyword does not appear after the original word to be matched, while the second type of positive fields may be configured to limit the circumstance that a fourth keyword appears after the original word to be matched, the third keyword and the fourth keyword can be the same or different.

In the example, the negative fields are classified according to different positions, and entries connected with the positive fields corresponding to the negative fields of the same type are determined as the second conditions in the second set, so that the phenomenon that, when the first word segmentation rule includes both the positive field and negative field at different positions, the second condition of the second set of such a first word segmentation rule is missed for acquisition is reduced.

In some other examples, the method further includes that: if the first condition in the first word segmentation rule is the closed condition, the first word segmentation rule is determined as the second word segmentation rule.

The method may further include that: if the first word segmentation rule includes the positive field with the positive meaning, the first word segmentation rule is determined as the second word segmentation rule.

The first word segmentation rule may include the positive field with the positive meaning, and then it may be determined that the first word segmentation rule is a determinate rule, so that the first word segmentation rule can be directly determined as the second word segmentation rule.

In the example, the first word segmentation rule including the closed condition is directly determined as the second word segmentation without conversion of the replacement conditions and the like, so that the processing speed is increased.

In Step 103, in response to determining that an intersection exists between character strings of the text information matched by two of the second word segmentation rules, determining that two first word segmentation rules corresponding to the two of the second word segmentation rules associated with the intersection conflict.

Each character string matched by each of the second word segmentation rules may represent all character strings capable of meeting the second word segmentation rule.

The intersection may include a character string intersection between the character string, matched by one second word segmentation rule in any two of the second word segmentation rules, of the text information and the character string, matched with the other second word segmentation rule, of the text information. If the intersection exists between the character strings, matched by any two of the second word segmentation rules, of the text information, it is indicated that the character strings correspond to the intersection can meet both the any two of the second word segmentation rules, and since the second word segmentation rule is a determinate rule, the two first word segmentation rules corresponding to the any two of the second word segmentation rules associated with the intersection conflict.

That the intersection exists between the character strings, matched by any two of the second word segmentation rules, of the text information can be understood as that, for a first character string obtained when any word is matched by one second word segmentation rule in any two of the second word segmentation rules and a second character string obtained when any word is matched by the other second word segmentation rule, if the first character string and the second character string include the same word at a position adjacent to the original word, it is indicated that an intersection exists between the first character string and the second character string and it is further indicated that the intersection exists between the character strings matched by the two second word segmentation rules.

For example, the first second word segmentation rule is that, if the original word " 只有 " is suffixed with " 求 ", " 只有 " is replaced with " 以有 ", and the other second word segmentation rule is that, if the original word " 只有 " is prefixed with " 一 ", " 以有 " is replaced with " 以/有 ". In such case, the first second word segmentation rule in the rules may be matched according to any word to obtain any word including " 只有求 ", and thus " ·只有求 " is a character string that may be matched by the first second word segmentation rule. Correspondingly, the other second word segmentation rule in the rules may be matched according to any word to obtain any word including " 一只有 ", and thus " ·只有求 " is also a character string that may be matched by the other second word segmentation rule. Therefore, an intersection " 一以有求 " exists between the character string matched by the first second word segmentation rule and the character string matched by the other second word segmentation rule.

For another example, the first second word segmentation rule is that, if the original word " /主要/ " is prefixed with " 摊 " and suffixed with " 求 ", the original word " /主要 / " is replaced with the target word " 士/要 ", and the other second word segmentation rule is that, if the original word " /主要/ " is prefixed with " 一 ", " 只有 " is replaced with " 只/有 ". In such case, the first second word segmentation rule in the rules can be matched according to any word to obtain any word including " 摊/主要/求 ", and correspondingly, the other second word segmentation rule in the rules may be matched according to any word to obtain any word including " ·以有 ". Therefore, no intersection exists under the two second word segmentation rules.

For another example, the first second word segmentation rule is that, if the original word " 只有 " is suffixed with " 点 ", " 只有 " is replaced with " 只/有 ", and the other second word segmentation rule is that, if the original word " 只有 " is suffixed with " 些 ", " 只有 " is replaced with " 只/有 ". The first second word segmentation rule in the rules can be matched according to any word to obtain any word including " 只有点 ", and the other second word segmentation rule in the rules may be matched according to any word to obtain any word including " 只有些 ". " 点 " and " 些 " in " 只有点 "

and "只有些" are different, so that no intersection exists under the two second word segmentation rules.

In some examples, Step 103 may include that: each of the second word segmentation rules is converted into a rule set; each character string matched by each of the second word segmentation rules is determined according to the rule set; and when the intersection exists between the character strings matched by any two of the second word segmentation rules, it is determined that the two first word segmentation rules corresponding to the any two of the second word segmentation rules associated with the intersection conflict.

The rule set may include a rule meeting the second word segmentation rule, and there may be more than one rule meeting the second word segmentation rule. Determining each character string matched by each of the second word segmentation rules by use of the rules meeting the second word segmentation rules may cover all character strings that may be matched by all the second word segmentation rules as much as possible and reduce detection result inaccuracy caused by missing of the character strings.

The operation that each of the second word segmentation rules is converted into the rule set may include that:

Each of the second word segmentation rules is converted into a regular expression; and the regular expression is converted into an automaton language set of an automaton.

The regular expression is a logical formula for character string operations. A "rule character string" is formed by some pre-defined specific characters and combinations of these specific characters, and the "rule character string" may be configured to express a character string filtering logic. The regular expression may be configured to search and replace a text consistent with the second word segmentation rule, and the text is a character string matched by the second word segmentation rule.

Furthermore, converting the regular expression into the automaton language set of the automaton can rapidly obtain the character string matched by the second word segmentation rule, thereby rapidly determining whether an intersection exists between the character strings matched by any second word segmentation rules or not.

In the example, since the second word segmentation rule is converted into the regular expression, the second word segmentation rule may be conveniently converted into the automaton language set of the automaton, the processing speed may be increased, and high intelligence is achieved.

It is to be supplemented that the intersection may be obtained according to the automaton language set of the automaton immediately when configuration information is completed, and the circumstance that the intersection between the matched character strings is detected when the configuration information is executed is avoided. Therefore, according to the example, converting the second word segmentation rule into the regular expression recognizable for the automaton may not only bring convenience to use but also detect the configuration information in advance to determine the two first word segmentation rules that conflict to enable a user to timely regulate the determined two first word segmentation rules that conflict to replan the configuration information and improve reliability and stability of the configuration information.

In Step 104, processing the text information according to the configuration information, and outputting a result of the word segmentation on the text information.

In the example, the terminal may convert the first word segmentation rules in the configuration information to obtain the second word segmentation rules, the second word segmentation rules being determinate word segmentation rules. Therefore, the first word segmentation rules that conflict in the configuration information may be rapidly and accurately found by use of the determinate second word segmentation rules.

The first word segmentation rules that conflict in the configuration information are found, and a developer may further modify the found first word segmentation rules that conflict to obtain modified configuration information, so that the first word segmentation rules that conflict in the configuration information can be reduced. This means that processing the text information based on the configuration information and outputting the word segmentation result of the text information can make the obtained word segmentation result more accurate, thereby finally achieving higher reliability and stability of performing word segmentation on the text information based on the configuration information.

Furthermore, the present disclosure also provides an example to further understand the method for performing word segmentation on text information provided in the examples of the present disclosure.

Figure 2:
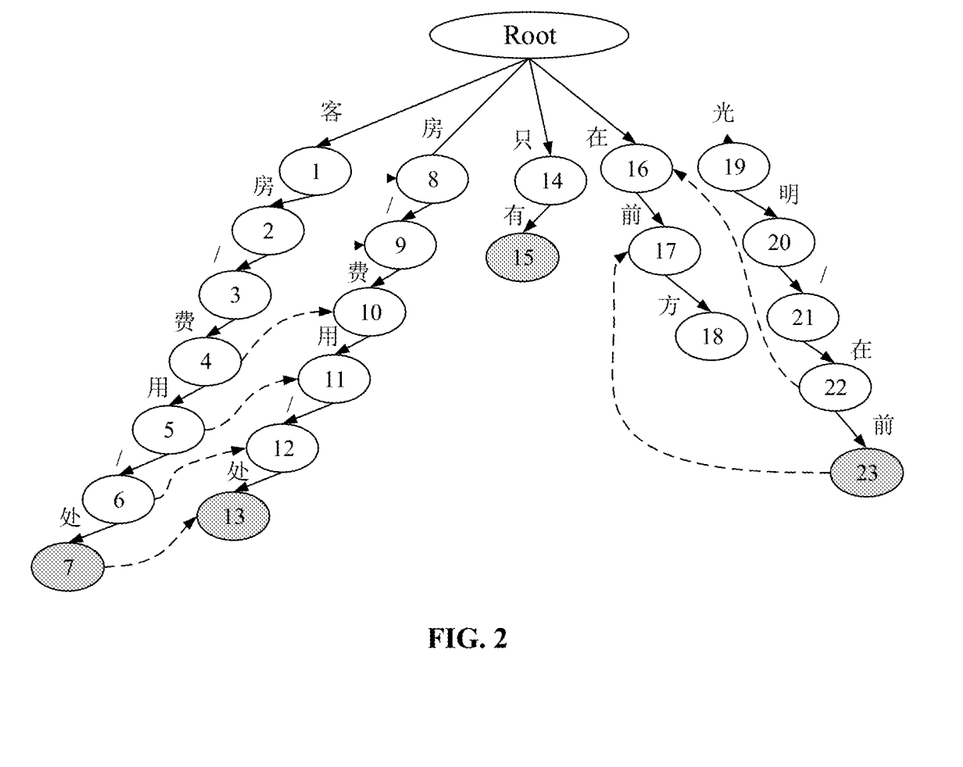
FIG. 2 is a tree diagram output by performing word segmentation on text information in the related art.

Referring to FIG. 2, FIG. 2 is a tree diagram output by performing word segmentation on text information in the related art. As shown in FIG. 2, a corresponding word segmentation result of an input text can be output according to the configuration information by use of a Trie tree. When text information input into the Trie tree includes words "客房/费用/处", if two states 7 and 13 can be simultaneously matched, it is indicated that a corresponding rule under which the state 7 is formed and a corresponding rule under which the state 13 is formed in the configuration information conflict. When words "光明/在前方" are input into the Trie tree, if two states 18 and 23 can be simultaneously matched, it is indicated that a corresponding rule under which the state 18 is formed and a corresponding rule under which the state 23 is formed in the configuration information conflict.

It is to be noted that the corresponding rules under which the states 7, 13, 18 and 23 are formed are determinate rules.

For the problem that whether some indeterminate word segmentation rules in the configuration information conflict with other word segmentation rules in the configuration information or not may not be determined according to a tree input manner, it is provided in the example that each word segmentation rule is converted into a determinate word segmentation rule according to all word segmentation rules in the configuration information, determinate word segmentation rules are converted into themselves, and indeterminate word segmentation rules can be converted into determinate word segmentation rules in a manner of replacing first conditions in the first word segmentation rules.

The word segmentation rule that has yet not been converted may be the first word segmentation rule in the abovementioned example, and the word segmentation rule obtained by conversion is the second word segmentation rule in the abovementioned example.

Figure 3:
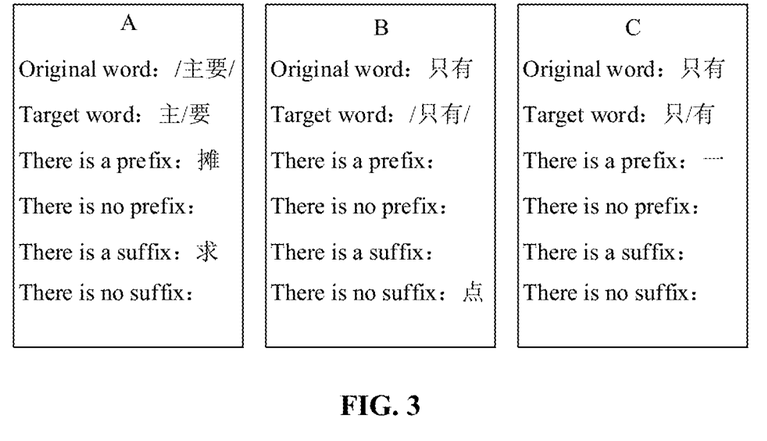
FIG. 3 is a schematic diagram illustrating a scenario of a method for performing word segmentation on text information according to some examples of the disclosure.

Referring to FIG. 3, the configuration information includes a first word segmentation rule A, a first word segmentation rule B and a first word segmentation rule C. The first word segmentation rule B may include an original word "只有", a target word "只有" and an open condition "点" does not appear after the original word to be matched", and this means that, if "点" does not appear after "只有" in input text information, "只有" is replaced as a whole word. The first word segmentation rule C includes an original word "只有", a target word "只/有" and an open condition ""一" appears before the original word to be matched", and this means that, if "一" appears before "只有" in the input text information, "只有" is segmented into "只" and "有". Apparently, if the input text information includes a character string "一只有些", both the first word segmentation rule B and the first word segmentation rule C are met, and thus the first word segmentation rule B conflicts with the first word segmentation rule C.

If a tree diagram is output by use of the related art, referring to FIG. 2 again, a state 15 is formed for output of the Trie tree under both the first word segmentation rule B and the first word segmentation rule C, and thus whether a word segmentation rule including an open condition, i.e., an indeterminate word segmentation rule, conflicts with another word segmentation rule or not may not be detected by use of the tree diagram output by a method for performing word segmentation on text information in the related art. Therefore, whether word segmentation rules in a configuration file conflict or not may not be determined by use of the related art.

In the example, the method for performing word segmentation on text information may include that: text information and configuration information are acquired, the configuration information including at least two first word segmentation rules; if the first word segmentation rule includes negative fields with a negative meaning, a second set is obtained according to a first set, the first set including replacement conditions in the at least two first word segmentation rules, a second condition in the second set being a replacement condition, except a first condition, in the first set and the replacement condition being a condition for replacement of an original word with a target word; and a second word segmentation rule is formed based on the original word and the target word in the first word segmentation rule, and the second condition.

Referring to FIG. 3 again, the configuration information includes a first word segmentation rule A, a second word segmentation rule B and a second word segmentation rule C, both the second word segmentation rule C and the second word segmentation rule B including open conditions, so that an entry connected with positive fields in the first word segmentation rule A including the positive field with a positive meaning may be determined as the second condition in the second set.

Furthermore, the negative field is the second type of negative fields in the abovementioned example.

If the first word segmentation rule includes negative fields, the second condition in the second set is determined based on an entry connected with positive fields in the first word segmentation rule including the positive field in the configuration information, including that: if the first word segmentation rule includes a second type of negative fields, the second condition in the second set is determined based on an entry connected with a second type of positive fields of the first word segmentation rule including the second type of positive fields in the configuration information, the second type of negative fields and the second type of positive fields being at a same position in the first word segmentation rule, but with different meanings.

A condition represented by a second type of negative fields of the first word segmentation rule B may be that an original word to be matched is not suffixed with "点", it is necessary to create the second condition in the second set by use of a condition represented by a suffix field of the first word segmentation rule A, and then the second word segmentation rule B is formed by use of the second condition in the second set and the original word and the target word of the first word segmentation rule B. The second word segmentation rule B may include the original word "只有", the target word "只有", the open condition that there is no suffix "点" and a closed condition that there is a suffix "求".

Therefore, the indeterminate first word segmentation rule B can be converted into the second word segmentation rule B including the closed condition.

Furthermore, in some examples, the second word segmentation rule converted from each rule is converted into a regular expression; the regular expression is converted into an automaton language set of an automaton; and when an intersection exists between character strings matched by any two of the second word segmentation rules, it is determined that the two first word segmentation rules corresponding to the any two of the second word segmentation rules associated with the intersection conflict.

Specifically, the first word segmentation rule A is converted into a regular expression "摊/主变/求", the first word segmentation rule B is converted into a regular expression ".{0,NUM} 只有求", and the first word segmentation rule C is converted into a regular expression "一只有.{0,NUM}". Then, the regular expressions are converted into automaton language set of the automaton respectively, and it is determined that the two first word segmentation rules corresponding to the any two of the second word segmentation rules associated with the intersection conflict according to whether the intersection exists between character strings matched by automaton voices in the automaton language set or not.

Referring to FIG. 2 again, the intersection of the automaton language sets corresponding to the first word segmentation rule B and first word segmentation rule C in the configuration information may be represented as follows:

Automaton('.{0,2} 只有求')∩Automaton(' 一只有.{0,2}')
=一只有求 Therefore, a character string matched by the intersection of the automaton language sets corresponding to the first word segmentation rule B and the first word segmentation rule C is "一只有求", and furthermore, the first word segmentation rule B conflicts with the first word segmentation rule C.

The intersection of the automaton language sets corresponding to the first word segmentation rule A and the first word segmentation rule C may be represented as follows:

Automaton('. 摊/主变/求')∩Automaton(' 一只有.{0,2}')
=Null Set Therefore, the first word segmentation rule A does not conflict with the first word segmentation rule C.

With adoption of the method of the above example, whether some indeterminate word segmentation rules conflict with the other rules in the configuration information or not can be determined. In addition, with adoption of automaton set voices for word segmentation, detection can be executed not in an execution stage of the configuration information but immediately after the configuration information is completed, so that reliability, stability and processing speed before execution of the configuration information can be ensured.

Figure 4:
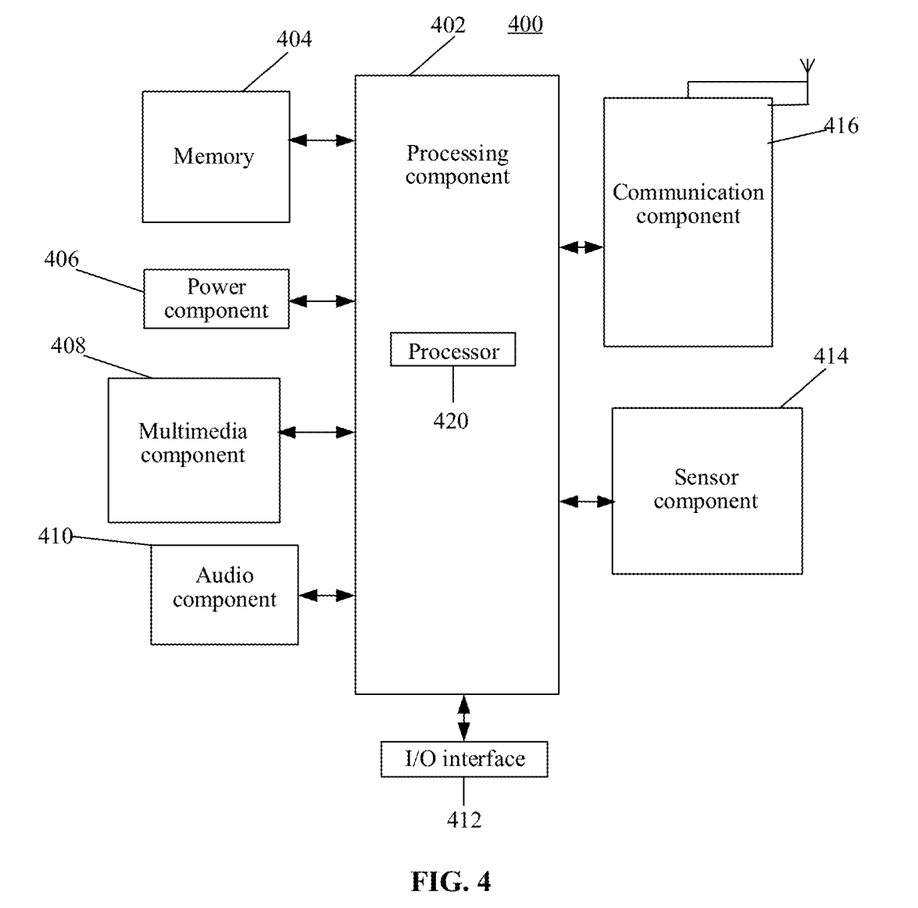
FIG. 4 is a block diagram of a terminal according to some examples of the disclosure.

FIG. 4 is a block diagram of a terminal 400, according to some examples of the disclosure. For example, the terminal 400 may be a mobile phone, a computer, a digital broadcast terminal, a messaging device, a gaming console, a tablet, a medical device, a fitness equipment, a personal digital assistant and the like.

Referring to FIG. 4, the terminal 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the terminal 400, such as the operations associated with display, telephone calls, data communications, camera operations, and recording operations. The processing component 402 may include one or more processors 420 to execute instructions to perform all or part of the steps in the abovementioned method. Moreover, the processing component 402 may include one or more modules which facilitate interaction between the processing component 402 and the other components. For instance, the processing component 402 may include a multimedia module to facilitate interaction between the multimedia component 408 and the processing component 402.

The memory 404 is configured to store various types of data to support the operation of the terminal 400. Examples of such data include instructions for any application programs or methods operated on the terminal 400, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 406 provides power for various components of the terminal 400. The power component 406 may include a power management system, one or more power supplies, and other components associated with generation, management and distribution of power for the terminal 400.

The multimedia component 408 includes a screen providing an output interface between the terminal 400 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 408 includes a front camera and/or a rear camera. The front camera and/or the rear camera may receive external multimedia data when the terminal 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a microphone (MIC), and the MIC is configured to receive an external audio signal when the terminal 400 is in the operation mode, such as a call mode, a recording mode and a voice recognition mode. The received audio signal may further be stored in the memory 804 or sent through the communication component 416. In some examples, the audio component 410 further includes a speaker configured to output the audio signal.

The I/O interface 412 provides an interface between the processing component 402 and a peripheral interface module, and the peripheral interface module may be a keyboard, a click wheel, a button and the like. The button may include, but not limited to: a home button, a volume button, a starting button and a locking button.

The sensor component 414 includes one or more sensors configured to provide status assessment in various aspects for the terminal 400. For instance, the sensor component 414 may detect an on/off status of the terminal 400 and relative positioning of components, such as a display and small keyboard of the terminal 400, and the sensor component 414 may further detect a change in a position of the terminal 400 or a component of the terminal 400, presence or absence of contact between the user and the terminal 400, orientation or acceleration/deceleration of the terminal 400 and a change in temperature of the terminal 400. The sensor component 414 may include a proximity sensor configured to detect presence of an object nearby without any physical contact. The sensor component 414 may also include a light sensor, such as a complementary metal oxide semiconductor (CMOS) or charge coupled device (CCD) image sensor, configured for use in an imaging application. In some examples, the sensor component 414 may also include an acceleration sensor, a gyroscope sensor, a magnetic sensor, a pressure sensor or a temperature sensor.

The communication component 416 is configured to facilitate wired or wireless communication between the terminal 400 and other equipment. The terminal 400 may access a communication-standard-based wireless network, such as a wireless fidelity (WiFi) network, a 2nd-generation (2G) or 3rd-generation (3G) network or a combination thereof. In an example, the communication component 416 receives a broadcast signal or broadcast associated information from an external broadcast management system through a broadcast channel. In an example, the communication component 416 further includes a near field communication (NFC) module to facilitate short-range communication. For example, the NFC module may be implemented based on a radio frequency identification (RFID) technology, an infrared data association (IrDA) technology, an ultra-wide band (UWB) technology, a bluetooth (BT) technology and another technology.

In an example, the terminal 400 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an example, there is also provided anon-transitory computer-readable storage medium including instructions, such as the memory 404 including instructions, and the instructions may be executed by the processor 420 of the terminal 400 to implement the abovementioned method. For example, the non-transitory computer-readable storage medium may be a ROM, a RAM, a CD-ROM, a magnetic tape, a floppy disc, an optical data storage device and the like.

According to a non-transitory computer-readable storage medium, an instruction in the storage medium is executed by a processor of a terminal to enable the terminal to execute the method for performing word segmentation on text information of each abovementioned example.

The technical solutions provided by examples of the present disclosure may have the following beneficial effects.

In the examples of the present disclosure, acquiring the text information and configuration information, in which the configuration information includes at least two first word segmentation rules; converting the first word segmentation rules into second word segmentation rules according to a predetermined rule; when an intersection exists between character strings of the text information matched by any two of the second word segmentation rules, determining that two first word segmentation rules corresponding to the any two of the second word segmentation rules associated with the intersection conflict; and processing the text information according to the configuration information, and outputting a result of the word segmentation on the text information. In the examples of the present disclosure, the first word segmentation rules in the configuration information can be converted into the second word segmentation rules, that is, the first word segmentation rules originally including indeterminate circumstances can be changed into the second word segmentation rules including determinate circumstances by conversion, and then a matched character string intersection is determined through the second word segmentation rules including the determinate circumstances, thereby determining whether the corresponding first word segmentation rules conflict or not. Therefore, according to the examples, the first word segmentation rules that conflict in the configuration information can be rapidly found, and a checking result obtained by checking based on the determinate word segmentation rules is more accurate.

Furthermore, according to the technical solutions of the examples, the first word segmentation rules that conflict in the configuration information can be found, and a developer can further modify the found first word segmentation rules that conflict to reduce the first word segmentation rules that conflict in the configuration information and make the word segmentation result obtained based on all the first word segmentation rules more accurate, thereby finally achieving higher reliability and stability of performing word segmentation on the text information based on the configuration information.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof

What is claimed is:

1. A method for performing word segmentation on text information, comprising:
    acquiring, by a terminal, the text information and configuration information, wherein the configuration information comprises at least two first, word segmentation rules, a first set exists and the first set comprises replacement conditions in the at least two first word segmentation rules, and each of the replacement conditions is used to replace an original word with a target word;
    in response to a first condition in the first word segmentation rule being an open condition, obtaining, by the terminal, a second set according to the first set, wherein the second set comprises a second condition, and the second condition is a replacement condition in the first set other than the first condition;
    forming, by the terminal, the second word segmentation rules, based on the original word and the target word in the first word segmentation rules, and the second condition;
    in response to determining that an intersection exists between character strings of the text information matched by two of the second word segmentation rules, determining, by the terminal, that two first word segmentation rules corresponding to the two of the second word segmentation rules associated with the intersection conflict;
    processing, by the terminal, the text information according to the configuration information, and outputting a result of the word segmentation on the text information; and
    performing, by the terminal, at least one of text search or text reading according to the output result of the word segmentation on the text information.

2. The method of claim 1, wherein, in response to the first condition in the first word segmentation rule being the open condition, obtaining, by the terminal, the second set according to the first set comprises:
    in response to the first condition in the first word segmentation rule being the open condition, determining, by the terminal, the second condition in the second set based on an entry limited by a closed condition in the first word segmentation rule in the configuration information; and
    obtaining, by the terminal, the second set according to the second condition in the second set.

3. The method of claim 2, wherein:
    the open condition comprises negative fields with a negative meaning, wherein the negative fields with the negative meaning comprise at least one of:
    a first type of negative fields before the original word in the first word segmentation rule; and
    a second type of negative fields after the original word in the first word segmentation rule;
    the closed condition comprises positive fields with a positive meaning; and
    in response to the first word segmentation rule comprising the open condition, determining, by the terminal, the second condition in the second set based on the entry limited by the closed condition in the first word segmentation rule in the configuration information comprises at least one of:
if the first word segmentation rule comprises the first type of negative fields, determining, by the terminal, the second condition in the second set based on an entry connected with a first type of positive fields of the first word segmentation rule comprising the first type of positive fields in the configuration information, wherein the first type of negative fields and the first type of positive fields are at a same position in the first word segmentation rule but with different meanings, and
if the first word segmentation rule comprises the second type of negative fields, determining, by the terminal, the second condition in the second set, based on an entry connected with a second type of positive fields of the first word segmentation rule comprising the second type of positive fields in the configuration information, wherein the second type of negative fields and the second type a positive fields are at a same position in the first word segmentation rule but with different meanings, and the second type of negative fields and the first type of negative fields are at different positions in the first word segmentation rule.

4. The method of claim 1, further comprising:
in response to the first condition in the first word segmentation rule being the closed condition, determining, by the terminal, the first word segmentation rule as the second word segmentation rule.

5. The method of claim 1, wherein in response to determining that the intersection exists between the character strings of the text information matched by two of the second word segmentation rules, determining, by the terminal, that the two first word segmentation rules corresponding to the two of the second word segmentation rules associated with the intersection conflict comprises:
converting, by the terminal, each of the second word segmentation rules into a rule set;
determining, by the terminal, each character string matched by each of the second word segmentation rules according to the rule set; and
in response to determining that the intersection exists between the character strings matched by two of the second word segmentation rules, determining, by the terminal, that the two first word segmentation rules corresponding to the two of the second word segmentation rules associated with the intersection conflict.

6. The method of claim 5, wherein converting, by the terminal, each of the second word segmentation rules into the rule set comprises:
converting, by the terminal, each of the second word segmentation rules into a regular expression; and
converting, by the terminal, the regular expression into an automaton language set of an automaton.

7. A terminal, comprising:
a processor; and
a memory, configured to store instructions executable by the processor,
wherein the processor is configured to:
acquire the text information and configuration information, wherein the configuration information comprises at least two first word segmentation rules, a first set exists and the first set comprises replacement conditions in the at least two first word segmentation rules, and each of the replacement conditions is used to replace an original word with a target word;
in response to a first condition in the first word segmentation rule being an open condition, obtain a second set according to the first set, wherein the second set comprises a second condition, and the second condition is a replacement condition in the first set other than the first condition;
form the second word segmentation rules, based on the original word and the target word in the first word segmentation rules, and the second condition;
in response to determine that an intersection exists between character stings of the text information matched by two of the second word segmentation rules, determine that two first word segmentation rules corresponding to the two of the second word segmentation rules associated with the intersection conflict;
process the text information according to the configuration information and output a result of the word segmentation on the text information; and
perform at least one of text search or text reading according to the output result of the word segmentation on the text information.

8. The terminal of claim 7, wherein the processor is further configured to:
in response to the first condition in the first word segmentation rule being the open condition, determine the second condition in the second set based on an entry limited by a closed condition in the first word segmentation in the configuration information and obtain the second set according to the second condition in the second set.

9. The terminal of claim 8, wherein:
the open condition comprises negative fields with a negative meaning, wherein the negative fields with the negative meaning comprise at least one of:
a first type of negative fields before the original word in the first word segmentation rule; and
a second type of negative fields after the original word in the first word segmentation rule;
the closed condition comprises positive fields with a positive meaning; and
the processor is further configured to execute at least one of:
if the first word segmentation rule comprises the first type of negative fields, determine the second condition in the second set based on an entry connected with a first type of positive fields of the first word segmentation rule comprising the first type of positive fields in the configuration information, wherein the first type of negative fields and the first type of positive fields are at a same position in the first word segmentation rule, but with different meanings, and
if the first word segmentation rule comprises the second type of negative fields, determine the second condition in the second set based on an entry connected with a second type of positive fields of the first word segmentation rule comprising the second type of positive fields in the configuration information, wherein the second type of negative fields and the second type of positive fields are at a same position in the first word segmentation rule, but with different meanings, and the second type of negative fields and the first type of negative fields are at different positions in the first word segmentation rule.

10. The terminal of claim 7, wherein the processor is further configured to:

in response to the first condition in the first word segmentation rule being the closed condition, determine the first word segmentation rule as the second word segmentation rule.

11. The terminal of claim 7, wherein the processor is further configured to:
convert each of the second word segmentation rules into a rule set;
determine each character string matched by each of the second word segmentation rules according to the rule set; and
in response to determine that the intersection exists between the character strings matched by two of the second word segmentation rules, determine that the two first word segmentation rules corresponding to the two of the second word segmentation rifles associated with the intersection conflict.

12. The terminal of claim 11, wherein the processor is further configured to:
convert each of the second word segmentation rules into a regular expression; and
convert the regular expression into an automaton language set of an automaton.

13. A non-transitory computer-readable storage medium, wherein a computer program is stored therein, and the computer program, when executed by a processor, causes the processor to implement a method for performing word segmentation on text information, wherein the method comprises:
acquiring the text information and configuration information, wherein the configuration information comprises at least two first word segmentation rules, a first set exists and the first set comprises replacement conditions in the at least two first word segmentation rules, and each of the replacement conditions is used to replace an original word with a target word;
in response to a first condition in the first word segmentation rule being an open condition, obtaining a second set according to the first set, wherein the second set comprises a second condition, and the second condition is a replacement condition in the first set other than the first condition;
forming the second word segmentation rules, based on the original word and the target word in the first word segmentation rules, and the second condition;
in response to determining that an intersection exists between character strings of the text information matched by two of the second word segmentation rules, determining that two first word segmentation rules corresponding to the two of the second word segmentation rules associated with the intersection conflict;
processing the text information according to the configuration information, and outputting a result of the word segmentation on the text information; and
performing at least one of text search or text reading according to the output result of the word segmentation on the text information.

14. The non-transitory computer-readable storage medium of claim 13, wherein, in response to the first condition in the first word segmentation rule being the open condition, obtaining the second set according to the first set comprises:
in response to the first condition in the first word segmentation rule being the open condition, determining the second condition in the second set based on an entry limited by a closed condition in the first word segmentation rule in the configuration information; and
obtaining the second set according to the second condition in the second set.

15. The non-transitory computer-readable storage medium of claim 14, wherein:
the open condition comprises negative fields with a negative meaning, wherein the negative fields with the negative meaning comprise at least one of:
a first type of negative fields before the original word in the first word segmentation rule; and
a second type of negative fields after the original word in the first word segmentation rule;
the closed condition comprises positive fields with a positive meaning; and
in response to the first word segmentation rule comprising the open condition, determining the second condition in the second set, based on the entry limited by the closed condition in the first word segmentation rule in the configuration information comprises at least one of;
if the first word segmentation rule comprises the first type of negative fields, determining the second condition in the second set based on an entry connected with a first type of positive fields of the first word segmentation rule comprising the first type of positive fields in the configuration information, wherein the first type of negative fields and the first type of positive fields are at a same position in the first word segmentation rule, but with different meanings, and
if the first word segmentation rule comprises the second type of negative fields, determining the second condition in the second set based on an entry connected with a second type of positive fields of the first word segmentation rule comprising the second type of positive fields in the configuration information, wherein the second type of negative fields and the second type of positive fields are at a same position in the first word segmentation rule, but with different meanings, and the second type of negative fields and the first type of negative fields are at different positions in the first word segmentation rule.

16. The non-transitory computer-readable storage medium of claim 13, further comprising:
in response to the first condition in the first word segmentation rule being the closed condition, determining the first word segmentation rule as the second word segmentation rule.

17. The non-transitory computer-readable storage medium of claim 13, wherein, in response to determining that the intersection exists between the character strings of the text information matched by two of the second word segmentation rules, determining that the two first word segmentation rules corresponding to the two of the second word segmentation rules associated with the intersection conflict comprises:
converting each of the second word segmentation rules into a rule set;
determining each character string matched by each of the second word segmentation rules according to the rule set; and
in response to determining that the intersection exists between the character strings matched by two of the second word segmentation rules, determining that the two first word segmentation rules corresponding to the two of the second word segmentation rules associated with the intersection conflict.

* * * * *